United States Patent [19]

Schulze

[11] 4,077,919
[45] Mar. 7, 1978

[54] POLYURETHANE CATALYST

[75] Inventor: Heinz Schulze, Austin, Tex.

[73] Assignee: Texaco Development Corporation, New York, N.Y.

[21] Appl. No.: 625,973

[22] Filed: Oct. 28, 1975

[51] Int. Cl.$^2$ ............................................. C08G 18/20
[52] U.S. Cl. ..................... 260/2.5 AC; 260/75 NC; 260/77.5 AC
[58] Field of Search ................. 260/2.5 AC, 77.5 AC, 260/75 NC

[56] References Cited

U.S. PATENT DOCUMENTS

| | | | |
|---|---|---|---|
| 2,965,584 | 12/1960 | Elkin | 260/2.5 AC |
| 3,019,200 | 1/1962 | Gee et al. | 260/2.5 AC |
| 3,073,787 | 1/1963 | Krakler | 260/2.5 AC |
| 3,234,153 | 2/1966 | Britain | 260/2.5 AC |
| 3,244,707 | 4/1966 | Dowbenko | 260/2.5 AC |
| 3,341,482 | 9/1967 | Gmitter | 260/2.5 AC |
| 4,007,140 | 2/1977 | Ibbotson | 260/2.5 AC |
| 4,011,223 | 3/1977 | Priest et al. | 260/2.5 AC |

*Primary Examiner*—Eugene C. Rzucidlo

*Attorney, Agent, or Firm*—Carl G. Ries; Thomas H. Whaley; James L. Bailey

[57] ABSTRACT

Covers a method for producing a polyurethane which comprises:
reacting an organic polyisocyanate with an organic polyester polyol or polyether polyol in the presence of a catalytic amount of an amine compound selected from the group consisting of:

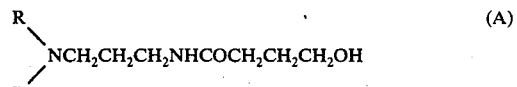

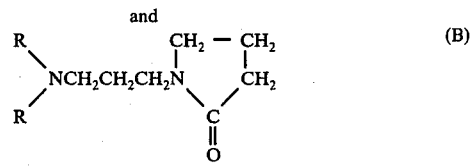

and mixtures of (A) and (B), where R is lower alkyl. Also covers polyurethane polymers such as polyurethane foams resultant therefrom.

6 Claims, No Drawings

POLYURETHANE CATALYST

BACKGROUND OF THE INVENTION

1. Field of the Invention

This invention pertains to the field of urethane catalysts. More particularly, this invention relates to the use of certain amines as urethane catalysts.

2. Description of the Prior Art

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain extending isocyanate-hydroxyl reaction by which a hydroxyl-containing molecule is reacted with an isocyanate-containing molecule to form a urethane. This increases the viscosity of the mixture and provides a polyurethane containing secondary nitrogen atom in the urethane groups. A second reaction is a cross-linking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of the foam. This third reaction is not essential if an extraneous blowing agent, such as a halogenated, normally liquid hydrocarbon, carbon dioxide, etc., is employed, but is essential if all or even a part of the gas for foam generation is to be generated by this in situ reaction (e.g. in the preparation of "one-shot" flexible polyurethane foams.)

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage or poorly defined cells. The foam will not be stable in the absence of adequate crosslinking.

It has long been known that tertiary amines, such as trimethylamine, triethylamine, etc., are effective for catalyzing the second crosslinking reaction. Some of the tertiary amines are effective for catalyzing the third water-isocyanate reaction for carbon dioxide evolution. However, tertiary amines are only partially effective as catalysts for the first chain extension reaction. To overcome this problem, the so-called "prepolymer" technique has been developed wherein a hydroxy-containing polyol component is partially reacted with the isocyanate component in order to obtain a liquid prepolymer containing free isocyanate groups. This prepolymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein a tertiary amine, such as triethylenediamine, is employed in conjunction with an organic tin compound. Triethylenediamine is particularly active for promoting the water-isocyanate reaction and the tin compound is particularly active in synergistic combination with the triethylenediamine for promoting the chain extension reaction. However, even here, the results obtained leave much to be desired. Triethylenediamine is a solid and must be dissolved prior to use to avoid processing difficulties. Also, triethylenediamine and other of the prior art amines can impart a strong amine odor to the polyurethane foam.

It would therefore be a substantial advance in the art if a new class of amine catalysts were discovered which overcome some of the just enumerated disadvantages of the prior art.

SUMMARY OF THE INVENTION

It has now been found that compounds consisting of the condensation products of 3-dialkylaminopropylamine and gamma butyrolactone are excellent liquid polyurethane catalysts having a low vapor pressure at ambient temperature. The liquid, low odor catalysts include:

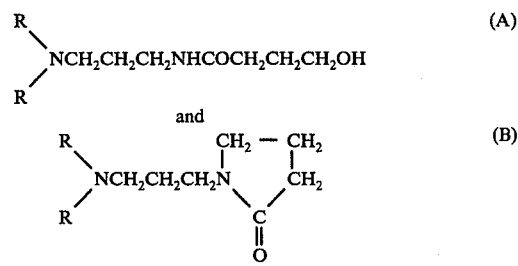

and mixtures thereof. The R group in compounds (A) and (B) represents a lower alkyl group, and more often a lower alkyl group containing 1–4 carbon atoms. Preferred lower alkyl groups include methyl, ethyl, n-propyl, and n-butyl. Most preferably R represents methyl.

The catalysts here are simply prepared by condensing 3-dialkylaminopropylamine and gamma-butyrolactone, preferably on a mol to mol basis. The reactants are known materials and readily available.

One may prepare compound A or B depending upon the reaction conditions employed, particularly depending upon the heat and degree of temperature. To prepare compound A or the straight chain material one need only heat the reactants for a short time at a relatively low temperature. Usually compound A is formed by heating at a temperature of less than 100° C. for ½–4 hours.

The ring compound B is formed by simply further heating at a higher temperature and under pressure compound A, either after isolating compound A or by merely increasing the severity of the temperature condition in reacting the initial reactants of 3-dialkylaminopropylamine and gamma-butyrolactone. Thus, further heating of compound A causes ring closure to form N-substituted pyrrolidone compound B. Generally to form compound B one heats the reactants of 3-dialkylaminopropylamine and gamma-butyrolactone or compound A itself at a temperature greater than 150° C. for 1–10 hours. Usually the pyrrolidone derivative is formed at a temperature of 150°–250° C. over a period of time ranging from about 2 to about 8 hours and under a pressure ranging from ambient to about 1,000 psi, more often 100–500 psi.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,4-diisocyanate, xylylene-1,3-diisocyanate, bis(4-isocyanatophenyl) methane, bis(3-methyl-4-isocyanatophenyl) methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyldiisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

The hydroxyl-containing polyol component which reacts with the isocyanate may suitably be a polyester polyol or a polyether polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from 350 to 700. Semi-rigid foams of a desired flexibility are provided when the hydroxyl number is intermediate to the ranges just given.

When the polyol is a polyester, it is preferable to use, as the polyester, a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids as phthalic acid, terephthalic acid, isophthalic acid, or the like, is nonethylenic and non-reactive. Thus, aromatic acids may be employed for the acid component. Aliphatic acids, such as succinic acid, adipic acid, sebacic acid, azelaic acid, etc., may also be employed. The alcohol component for the polyester should preferably contain a plurality of hydroxyl groups and is preferably an aliphatic alcohol, such as ethylene glycol, propylene glycol, dipropylene glycol, diethylene glycol, glycerol, pentaerthyritol, trimethyloethane, trimethylolpropane, mannitol, sorbitol, or methyl glucoside. Mixtures of two or more of the above identified alcohols may be employed also if desired. When a flexible urethane foam is desired, the polyol should preferably have an average functionality of from about 2 to about 4 and a molecular weight of from about 2,000 to about 4,000. For rigid foams, the functionality of the polyol component is preferably from about 4 to about 7.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 500 to about 700. For flexible polyether polyurethane foams, the alkylene oxide is preferably propylene oxide or a mixture of propylene oxide and ethylene oxide and the molecular weight is preferably within the range of about 2,000 to 4,000.

For rigid polyether polyurethane foams, the polyol should have a functionality of from about 4 to about 7 and a molecular weight of from about 300 to about 1,000. Polyols for rigid polyether polyurethane foams may be made in various ways including the addition of an alkylene oxide as above to a polyhydric alcohol with a functionality of from 4 to 7. These polyols may also be, for example, Mannich condensation products of a phenol, an alkanolamine, and formaldehyde, which Mannich condensation product is then reacted with an alkylene oxide. See U.S. Pat. No. 3,297,597.

The amount of hydroxyl-containing polyol compound to be used relative to the isocyanate compound in both polyester and polyether foams normally should be such that the isocyanato groups are present in at least an equivalent amount, and preferably, in slight excess, compared with the free hydroxyl groups. Preferably, the ingredients will be proportioned so as to provide from about 1.05 to about 1.5 mol equivalents of isocyanato groups per mol equivalent of hydroxyl groups.

When water is used, the amount of water, based on the hydroxyl compound, is suitably within the range of about 0.05 to about 0.5 mol per mol equivalent of hydroxy compound.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc., may be used. The inert blowing agent reduces the amount of excess isocyanate and water that is required in preparing flexible urethane foam. For a rigid foam, it is preferable to avoid the use of water and to use exclusively the extraneous blowing agent. Selection of the proper blowing agent is well within the knowledge of those skilled in the art. See for example U.S. Pat. No. 3,072,082.

The catalysts discovered here as useful in the preparation of rigid or flexible polyester or polyether polyurethane foams based on the combined weight of the hydroxyl-containing compound and polyisocyanate, are employed in an amount of from about 0.05 to about 4.0 weight percent. More often that the amount of catalyst used is 0.1–1.0 weight percent.

The catalysts of this invention may be used either alone or in a mixture with one or more other tertiary amines or with an organic tin compound or other polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such other tertiary amines include trialkylamines (e.g. trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., aliphatic polyamines, such as N,N,N'N'-tetramethyl-1,3-butanediamine.

Conventional formulation ingredients are also employed, such as, for example, foam stabilizers also known as silicone oils or emulsifiers. The foam stabilizer may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; $n$ is an integer of from 4 to 8; $m$ is an integer of 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (.e.g., 10% to 100%) of the blowing agent. The foregoing methods are known to those skilled in the art, as evidenced by the following publication: duPont Foam Bulletin, "Evaluation of Some Polyols in One-Shot Resilient Foams," Mar. 22, 1960.

When it is desired to prepare rigid foams, the "one-shot" method or the so-called "quasi-prepolymer method" is employed, wherein the hydroxyl-containing component preferably contains from about 4 to 7 reactive hydroxyl groups, on the average, per molecule.

In accordance with the "quasi-prepolymer method", a portion of the hydroxyl-containing component is reacted in the absence of a catalyst with the polyisocyanate component in proportions so as to provide from about 20 percent to about 40 percent of free isocyanato groups in the reaction product, based on the polyol. To prepare a foam, the remaining portion of the polyol is added and the two components are allowed to react in the presence of catalytic systems such as those discussed above and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the prepolymer or remaining polyol, or both, prior to the mixing of the component, whereby at the end of the reaction a rigid polyurethane foam is provided.

Urethane elastomers and coatings may be prepared also by known techniques in accordance with the present invention wherein a tertiary amine of this invention is used as a catalyst. See, for example, duPont Bulletin PB-2, by Remington and Lorenz, entitled "The Chemistry of Urethane Coatings."

The invention will be illustrated further with respect to the following specific examples, which are given by way of illustration and not as limitations on the scope of this invention.

EXAMPLE I

Preparation of 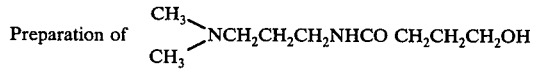

To 504 ml (4.0 mol) of 3-dimethylaminopropylamine was added gamma-butyrolactone (355 g, 4.12 mol) in 15 minutes at 25° C. with stirring. Within 75 minutes the temperature of the reaction mixture had increased to 72° C. Thereafter the temperature fell. After the reaction mixture had stood at room temperature overnight the mixture was heated one hour at 120° C. and the reaction mass stripped at 100° C. under a vacuum of 2 mm. The yellow residue analyzed as follows: 14.48% N, 5.28 meq/g total amine and 5.90 meq. total acetylatables. Structural confirmation of this compound was made by NMR.

EXAMPLE II

Preparation of 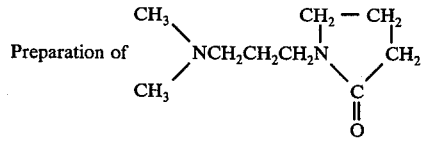

Water (50 ml), gamma-butyrolactone (2.0 mol, 172 g) and 3-dimethylaminopropylamine (252 ml, 2.0 mol) were heated five hours at 250° C. in a one liter, stirred autoclave. Maximum pressure was 380 psi. The reaction mixture was filtered and distilled. A fraction boiling at a Pot temperature of 149°–153° C./0.25 mm and an overhead temperature of 96°–98° C. consisted of 99.2 percent pure pyrrolidone compound (GLC, area percent). Analysis was as follows: 16.5% N, 5.82 meq/g tertiary amine.

EXAMPLE III

Here flexible polyurethane foams were prepared from the compounds of Examples I and II. A foam was also prepared from a commercially available amine catalyst, and in both instances foams prepared from the catalyst of the invention were comparable. Results are as follows:

TABLE I

| FOAM COMPONENT | Parts by Weight | | |
|---|---|---|---|
| Polyether Polyol* | 100.0 | 100.0 | 100.0 |
| Silicone Surfactant | 1.0 | 1.0 | 1.0 |
| Water | 4.6 | 4.6 | 4.6 |
| Tin Catalyst | 0.5 | 0.5 | 0.5 |
| Thancat® DD** | — | 0.1 | — |
| Example I Catalyst | 0.1 | — | — |
| Example II Catalyst | — | 0.1 | — |
| Toluene Diisocyanate (index 1.07) | 56.8 | 56.8 | 56.8 |
| Foam Properties | Seconds | | |
| Cream Time | 12 | 12 | 10 |
| Rise Time | 120 | 125 | 115 |

*Mixed ethylene oxide - propylene oxide adduct of trimethylol propane - OH No.=55-57
**Commercially available amine catalyst sold by Jefferson Chemical Co., Inc.

EXAMPLE IV

Here a semi-flexible polyurethane foam was prepared utilizing the following components. The catalyst of Example II was again comparable in utility to a commercially available catalyst. The resulting foams in all instances were satisfactory. Results are as follows:

TABLE II

| Foam Component | Parts by Weight | |
| --- | --- | --- |
| Polymeric Polyisocyanate | 26.6 | 26.6 |
| Polyether Polyols* | 100 | 100 |
| Calcium Carbonate | 20 | 20 |
| Carbon Black | 2.0 | 2.0 |
| Surfactant** | 1.2 | 1.2 |
| Water | 1.5 | 1.5 |
| Dibutyl tin dilaurate | 0.05 | 0.05 |
| Thancat® DM-70*** | 1.2 | 1.2 |
| Lead Naphthenate (36%) | 0.5 | 0.5 |
| Compound Example II | 0.1 | — |
| Thancat® DD | — | 0.1 |
| Foam Properties | Seconds | |
| Cream Time | 20 | 20 |
| Rise Time | 142 | 142 |

*60 parts of NIAX® 34-28 polyether polyol available from Union Carbide and 40 parts of Thanol® TE-4500 polyether triol available from Jefferson Chemical Co., Inc.
**Polymeric dimethylsilicone ethylene oxide adduct
***Amine catalyst available from Jefferson Chemical Co., Inc.

Still other foams and particularly high resilient molded foams were prepared using the catalysts of the invention, and such catalyst were found also effective here.

I claim:

1. A method for producing a polyurethane which comprises:

reacting an organic polyisocyanate with an organic polyester polyol or polyether polyol in the presence of a catalytic amount of amine compound selected from the group consisting of:

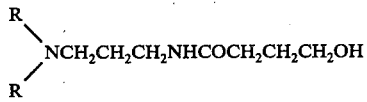

and

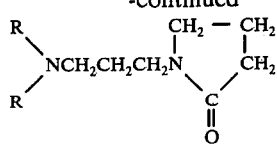

and mixtures of (A) and (B), where R is lower alkyl.

2. The method of claim 1 wherein said organic polyisocyanate has a functionality of from 2 to about 4, and said organic polyester or polyol polyether polyol has a hydroxyl number of from about 25 to about 700.

3. The method of claim 1 wherein R is methyl.

4. The method of claim 2 wherein a flexible polyether polyurethane foam is provided which comprises reacting in the presence of a blowing agent said organic polyisocyanate with a polyether polyol formed by the addition of a polyhydric alcohol having a functionality of from 2 to about 4 with an alkylene oxide of 2 to 4 carbon atoms in the presence of said catalyst, said organic polyisocyanate being employed in an amount sufficient to provide 1.0 to 1.5 mol equivalents of isocyanato groups per mol equivalent of hydroxy groups, said polyether polyol having a molecular weight within the range of about 500–700, and a hydroxyl number of from about 25 to about 60.

5. The method of claim 2 wherein a rigid polyether polyurethane foam is provided by reacting in the presence of a blowing agent said organic polyisocyanate with a hydroxy terminated polyether in the presence of said catalyst, said polyisocyanate being employed in an amount sufficient to provide 1.0 to 1.5 mol equivalents of isocyanato groups per mol equivalent of hydroxyl groups in the hydroxy terminated polyether, said polyether having from about 4 to about 7 hydroxyl groups per molecule, a molecular weight within the range from 300 to about 1,000 and a hydroxyl number within the range of 350 to 700.

6. The method of claim 2 wherein a flexible polyester polyurethane foam is prepared which comprises reacting in the presence of a blowing agent toluene diisocyanate with a hydroxyl terminated condensation product of a polycarboxylic acid and a polyhydric alcohol in the presence of said catalyst, said toluene diisocyanate being employed in the amounts sufficient to provide 1.0 to 1.5 mol equivalents of isocyanato groups per mole equivalent of hydroxyl groups, said condensation product having a functionality from about 2 to about 4, and a molecular weight from about 2,000 to about 4,000, and a hydroxyl number ranging from about 20 to about 60.

* * * * *